United States Patent
Katagiri et al.

(10) Patent No.: US 7,429,053 B2
(45) Date of Patent: Sep. 30, 2008

(54) SUBFRAME STRUCTURE AND VIBRATION DAMPER FOR THE SAME

(75) Inventors: Akira Katagiri, Kasugai (JP); Takehiro Yamada, Inazawa (JP); Akihiro Miyoshi, Nishinomiya (JP); Tamio Tsurita, Osaka (JP); Motoshi Suzuki, Kariya (JP)

(73) Assignees: Tokai Rubber Industries, Ltd., Komaki (JP); Sumitomo Rubber Industries, Ltd., Kobe (JP); Sumitomo Electric Industries, Ltd., Osaka (JP); Advics Co., Ltd., Kariya (JP)

( * ) Notice: Subject to any disclaimer, the term of this patent is extended or adjusted under 35 U.S.C. 154(b) by 428 days.

(21) Appl. No.: 11/218,474

(22) Filed: Sep. 6, 2005

(65) Prior Publication Data

US 2006/0049603 A1 Mar. 9, 2006

(30) Foreign Application Priority Data

Sep. 9, 2004 (JP) ............................ 2004-262429

(51) Int. Cl.
*B62D 21/11* (2006.01)

(52) U.S. Cl. .................. 280/124.109; 180/299; 180/300; 324/207.11; 324/207.15; 324/207.2; 324/207.23; 324/207.26

(58) Field of Classification Search .......... 280/124.109, 280/124.177, 124.178, 124.1; 180/299, 300; 324/207.11, 207.13, 207.15, 207.2, 207.23, 324/207.24, 207.26, 207, 11
See application file for complete search history.

(56) References Cited

U.S. PATENT DOCUMENTS

| | | | |
|---|---|---|---|
| 4,836,578 A * | 6/1989 | Soltis .................... 280/6.15 |
| 4,966,384 A * | 10/1990 | Endo et al. ............. 280/124.109 |
| 5,086,649 A | 2/1992 | Yamaoka | |
| 5,226,635 A | 7/1993 | Nakamura | |
| 6,511,096 B1 * | 1/2003 | Kunert et al. ............... 280/785 |
| 6,623,020 B1 * | 9/2003 | Satou .................. 280/124.109 |
| 7,045,999 B2 * | 5/2006 | Ersoy et al. ............. 324/207.25 |
| 7,163,219 B2 * | 1/2007 | Seksaria et al. ........ 280/124.133 |
| 2004/0201196 A1 | 10/2004 | Katagiri et al. | |

FOREIGN PATENT DOCUMENTS

| | | |
|---|---|---|
| EP | 0 611 958 A2 | 8/1994 |
| JP | B2 2628444 | 4/1997 |
| JP | A 2001-191767 | 7/2001 |
| JP | A 2002-316502 | 10/2002 |
| JP | A 2003-214965 | 7/2003 |
| JP | A 2003-285728 | 10/2003 |
| JP | A 2004-17917 | 1/2004 |

* cited by examiner

*Primary Examiner*—Eric Culbreth
(74) *Attorney, Agent, or Firm*—Oliff & Berridge, PLC

(57) ABSTRACT

A subframe structure for an automotive vehicle wherein a subframe is attached through a rubber mount to a vehicle body, suspension components are assembled onto the subframe so that the suspension components are held connected to the vehicle body through the subframe, and a detecting assembly capable of providing an output signal according to a load that acts between a subframe and a vehicle body is provided. A rubber mount for use in this subframe structure is also disclosed.

7 Claims, 5 Drawing Sheets

VEHICLE LATERAL DIRECTION

VEHICLE LONGITUDINAL DIRECTION

SUBFRAME STRUCTURE AND VIBRATION DAMPER FOR THE SAME

INCORPORATED BY REFERENCE

The disclosure of Japanese Patent Application No. 2004-262429 filed on Sep. 9, 2004 including the specification, drawings and abstract is incorporated herein by reference in its entirety.

BACKGROUND OF THE INVENTION

1. Field of the Invention

The present invention relates to a vibration damper structure for subframes installed in automobiles, and to a subframe structure using the same. More particularly, the invention is concerned with a subframe structure equipped with detecting assembly for providing a signal for use as a detection signal for control in systems for controlling the state of travel of automobiles, and to rubber mounts for use in the subframe structure.

2. Description of the Related Art

There has long been research into suppressing unstable vehicle body behavior, such as slipping, through providing mechanical supplementation to the steering by the driver in order to improve the stability of motion of automobiles. Specifically, antilock braking systems (ABS) for suppressing the locking of wheels when braking have been brought to market, and there has been research into automobile control systems, such as for vehicle stability control, for the overall control of the stability of motion of vehicles, and for traction control to suppress slippage of wheels during acceleration.

These types of vehicle wheel control are performed using a variety of detection signals corresponding to the state of motion of the vehicle. A variety of structure have been proposed for detecting external forces acting upon the wheels such as the road friction and the effective vertical force, and detecting, for example, the coefficient of friction with the road surface, as structure for detecting these signals. JP-B-2628444, JP-A-2001-191767 and JP-A-2002-316502 disclose examples of such structure.

However, in a structure that is provided with embedded deformation gauges, equipped in holes in the axles, as described in the aforementioned JP-B-2628444, such structure are difficult to commercialize when one considers the strength and structure of the axles and when one considers manufacturability. In practice, since it is necessary to provide a plurality of holes in the axles in order to detect forces in a plurality of directions, there is a problem in that commercialization is all the more difficult.

Moreover, in a structure that is arranged for sensing deformation, rotation, etc., of the tire from the outside through the provision of detector targets on the tire, such as described in the aforementioned JP-A-200 1-191767, there are problems in that there is the risk that the performance of the tire will be compromised by the installation of the detection targets added to the tire. In addition to the problem of the likelihood of damage to the detection targets from flying gravel, mud, etc., from the surface of the road, and while the speed of rotation of the wheel can be detected easily, there is a problem in that it is extremely difficult to calculate, from the detected values, the external forces acting on the wheels.

Furthermore, in a structure that is arranged so as to detect, using position sensors, or the like, this location of the disk of the rim wheels through elastic linkage of a rim wheel to a disk part, as described in the aforementioned JP-A-2002-316502, the rigidity of the wheel itself is reduced by the necessity of the elastic linkage of the rim wheel to the disk part, which may have a negative impact on the stability of travel. Furthermore, since the sensor is located in a position that is extremely near to the tire, there is a problem in the ease with which the sensor may be damaged by gravel, mud, etc., thrown up from the road surface.

In consideration to the problems with the conventional structure like described above, the present assignees have already submitted U.S. patent application No. 10/795,152, proposing an anti-vibration device for a suspension that provides detecting assembly for detecting the load that acts between the vehicle body and the wheel. This type of anti-vibration structure for a suspension can be achieved through, for example, equipping a sensor for detecting loads or amounts of displacement relative to a suspension bushing, thereby enabling more accurate load detection than load detection based on tire deformation, or the like, doing so without a negative impact on the strength of the axle, the rigidity of the wheel, the performance of the tire, etc.

However, as the present assignees performed even more experimentation and research, it became clear that there was still room for improvement in the structure that use the invention from the prior application.

Specifically, when the wheels are attached to the vehicle body through the plurality of suspension bushings and detecting assembly are equipped on suspension bushings, the response at each suspension bushing to the component of force of the load applied to wheel is detected. Accordingly, in order to estimate, from the detected signal, the external forces that act on the wheel, it is necessary to calculate the total force, as the load that acts on the wheel, based on the component forces that are calculated by the signals that are detected from each of the suspension bushings. This requires a large number of detector positions, which is not only disadvantageous in terms of cost, but also problematic in terms of the difficulty of calculation.

Moreover, not only is the behavior of the tire complex, but the suspension parts undergo relatively large dislocations depending on the behavior of the tire to dislocate in the direction of the load that is applied to the suspension bushing. In some cases there are load inputs not only in the axial direction of the bushing and in a direction that is perpendicular to the axial direction of the bushing, but also input loads in a flexing direction and in the twisting direction, thus leading to the possibility of the occurrence of relatively large errors even in the calculation results that estimate the external forces that act on the wheels.

Moreover, the suspension bushing attachment angle, and by extension, the load input direction, also varies depending on the alignment (attachment angle) of the suspension parts. Therefore, when there are disruptions to the alignment of the suspension parts, due to impact loads on the wheels, there will also be deviations in the load detection of the suspension bushings, which can cause errors in the estimates of the external forces that act on the wheels.

SUMMARY OF THE INVENTION

It is therefore an object of the present invention to provide a subframe structure of novel construction, which is capable of simply providing a mechanism that can detect, more accurately and more rapidly, external forces acting on automobile wheels. It is also another object of the invention to provide a rubber mount that can be used in this subframe structure.

More specifically, the object of the present invention is to provide a subframe structure that is suitable for use as structural element in a vehicle control system, as a structure that detects signals for control in a vehicle control system, such as for controlling traction or controlling vehicle stability, and in antilock braking systems sued in order to improve the stability of travel of vehicles, and to provide a rubber mount that can be used in this subframe structure.

The above and/or optional objects of this invention may be attained according to at least one of the following modes of the invention. The following modes and/or elements employed in each mode of the invention may be adopted at any possible optional combinations. It is to be understood that the principle of the invention is not limited to these modes of the invention and combinations of the technical features, but may otherwise be recognized based on the teachings of the present invention disclosed in the entire specification and drawings or that may be recognized by those skilled in the art in the light of the present disclosure in its entirety.

A first aspect of the present invention relates to a subframe structure. A first mode of the first aspect of the invention provides a subframe structure for an automotive vehicle wherein a subframe is attached through a rubber mount to a vehicle body, suspension components are assembled onto the subframe so that the suspension components are held connected to the vehicle body through the subframe, and a detecting assembly capable of providing an output signal according to a load that acts between a subframe and a vehicle body is provided.

In the subframe structure arranged according to this mode, the total force that acts on each of the plurality of suspension components that suspend the wheels relative to the vehicle body can be detected through the load that acts between the subframe and the vehicle body. This enables the detection of data with a higher direct correlation to the external forces that act on the vehicle, in comparison with the case wherein are detected the loads acting on the suspension bushings, which are no more than the partial effects of components of the external forces that act on the wheels. This enables more accurate detection of the external forces that act on the wheels. It should be noted that the subframe components includes rods, links, arms, and the like.

Furthermore, the dimensions of the subframe members are large, not only enabling the detecting assembly to be attached easily, but also providing a large degree of freedom in the design of the attachment positions.

In addition, since the sum total of forces of the plurality of suspension components is detected as the load that acts between the subframe and the vehicle body, the alignments of the individual suspension components do not have a large effect on the detection results. Moreover, the subframe itself is large enough, relative to the suspension components, to be a strong stabilizing member, meaning that there is essentially no problem with variation in the state of attachment of the subframe to the vehicle body. Consequently, even when there is disruption to the alignment of the suspension components, the targeted detection accuracy can still be maintained with stability, reducing the likelihood of disruptions to the detection results, allowing the estimation of external forces with high reliability.

Furthermore, the subframe is a component that is attached nearer to the vehicle body, further from the wheel than the suspension components, allowing the detecting assembly to be equipped at a position that is suitably distant from the wheel through attachment of the detecting assembly to the subframe. This effectively prevents damage to the detecting assembly from gravel, mud, and the like thrown from the surface of the road and from interferences due to the roughness of the road surface, enabling excellent durability and the maintenance of reliability.

A second mode of the first aspect of the invention provides a subframe structure according to the first mode, wherein the detecting assembly is provided in at least one location in a vicinity of each end of the subframe in a lateral direction of the vehicle. In the subframe structure of construction according to the present mode, the detecting assembly can be improved in terms of accuracy of the detection results, by utilizing the characteristic that the amount of dislocation in each direction upon input of load from the wheels tends to be large in the vicinity of the ends of the subframe.

A third mode of the first aspect of the invention provides a subframe structure according to the first or second mode, further comprising a calculating unit for calculating each of the external forces acting on wheels of the vehicle in longitudinal, lateral, and vertical directions of the vehicle, based on output signals obtained from the detecting assembly. In the subframe structure arranged according to the present mode, the calculation of the external forces acting on the wheels of the vehicle in the longitudinal, lateral, and vertical directions enables the obtaining of detection results that can be used in a variety of applications such as, for example, antilock braking systems, traction control, and vehicle safety control.

A fourth mode of the first aspect of the invention provides a subframe structure according to any one of the first through third modes, wherein the detecting assembly includes a permanent magnet that is connected in a fixed position relative to one side of the subframe and the vehicle body, and a Hall element that is equipped in a fixed position relative to an other side of the subframe and the vehicle body. The permanent magnet, which produces a magnetic field and the Hall element, wherein changes in the magnetic flux density of the magnetic field is converted into an electric variable through the Hall effect and outputted, can measure the change in the relative distance between the permanent magnet and the Hall element in the subframe structure arranged according to this mode of the invention. In other words, since the magnetic flux density of the magnetic field of the permanent magnet, which is detected by the Hall element, varies depending on the relative distance between the permanent magnet and the Hall element, the electric variable that is outputted by the Hall element also varies. Namely, equipping the permanent magnet and the Hall element to the subframe side and the vehicle body side, respectively, enables changes in the relative distance between the subframe and the vehicle body to be outputted easily and efficiently. Moreover, with detecting assembly that use infrared light, for example, there may be large errors, or detection may not be possible, due to soiling with mud, or the like, because the detecting assembly are equipped on vehicles that are usually used outdoors. However, given the present form of embodiment wherein detection of the amount of dislocation is performed through changes in a magnetic field, the detection can be performed with stability, unaffected by soiling, etc.

A fifth mode of the first aspect of the invention provides a subframe structure according to any one of the first through fourth modes, wherein the detecting assembly is a relative position detecting assembly for detecting a relative amount of dislocation between the subframe and the vehicle body, in a total of three directions, those being an axial direction thereof and two directions that are perpendicular to the axial direction. In a subframe structure arranged according to this mode of the invention, the detection in the axial direction and in two mutually perpendicular directions that are perpendicular to the axial direction enables the accurate detection of the external forces that act on the wheels in the vehicle in the longitudinal, lateral, and vertical directions.

A sixth mode of the first aspect of the invention provides a subframe structure according to any one of the first through fifth modes, wherein the detecting assembly is equipped on the rubber mount for anti-vibration linking of the subframe to the vehicle body. In the subframe structure arranged according to this mode of the invention, the rubber mount is equipped in an attachment position of a suspension component relative to the vehicle body. Thus the attachment position of the detecting assembly can be set to be stationary relative to the vehicle body. As a result, there is no problem with the instability of the operation due to changes in the attachment position, enabling stabilized operating characteristics. In particular, when compared to the case wherein the detecting assembly are equipped on the wheel, there is a benefit in that it is possible to detect continuously the external forces that act on the wheel, even if the wheel is locked. Moreover, the equipping of the detecting assembly on the rubber mount makes commercialization easier through enabling the use, as is, of subframes and vehicle bodies that have been used conventionally, without requiring any particular restructuring of large component members such as the subframes or the vehicle body.

A seventh mode of the first aspect of the invention provides a subframe structure according to the sixth mode, wherein the rubber mount comprises an inner rod member that is rigidly affixed to the vehicle body, an outer cylinder member that is rigidly affixed to the subframe and disposed so as to enclose the inner rod member with a gap around an outer peripheral side of the inner rod member, a rubber elastic body that elastically connects this inner rod member and outer cylinder member, and a relative position detecting assembly for detecting the relative amount of dislocation of the inner rod member and the outer cylinder member. In the subframe structure arranged according to this mode of the invention, the detection of the amount of relative dislocation between the inner rod member, which is attached to the vehicle body, and the outer cylinder member, which is attached to the subframe, enables the practical detection of the amount of relative dislocation between the subframe and the vehicle body. Moreover, through providing the relative position detecting assembly in the rubber mount in advance can eliminate the need for the provision of a special process for attaching the relative position detecting assembly when attaching the rubber mount to the subframe, or the like. This allows the relative position detecting assembly to be attached to the subframe using essentially the same operation as for the attachment of a normal rubber mount.

A second aspect of the present invention relates to a rubber mount. A first mode of the second aspect of the invention provides a rubber mount for use in a subframe structure of construction according to any one of the first through seventh mode mentioned above, the rubber mount comprising: an inner rod member rigidly attached to the vehicle body; an outer cylinder member rigidly affixed to the subframe and disposed so as to enclose the inner rod member with a gap around an outer peripheral side of the inner rod member; a rubber elastic body elastically connecting the inner rod member and outer cylinder member; and a relative position detecting assembly for detecting the relative amount of dislocation of the inner rod member and the outer cylinder member so as to function as the detecting assembly.

A second mode of the second aspect of the invention provides a rubber mount according to the first mode, wherein the relative position detecting assembly detects an amount of relative dislocation between the inner rod member and the outer cylinder member in a total of three directions, those being an axial direction thereof and two mutually perpendicular directions that are perpendicular to the axial direction.

A third mode of the second aspect of the invention provides a rubber mount according to the first or second mode, wherein the relative position detecting assembly comprises: a permanent magnet that is connected in a fixed position relative to one side of the subframe and the vehicle body, and a Hall element that is equipped in a fixed position relative to an other side of the subframe and the vehicle body.

The use of the rubber mount structured according to any of the first through third modes of the second aspect of the invention, makes it possible to effectively provide the subframe structure described above.

As will be apparent from the description above, in the subframe structure, and the rubber mount used in the subframe structure arranged according to the present invention, the external forces that act on the wheels can be estimated with high accuracy and certainty, in a simple form, and without being affected by extraneous factors such as error, attachment position, deviation in attachment alignment, and so forth, through focusing on the subframe.

BRIEF DESCRIPTION OF THE DRAWINGS

The forgoing and/or other objects features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Figure 1:
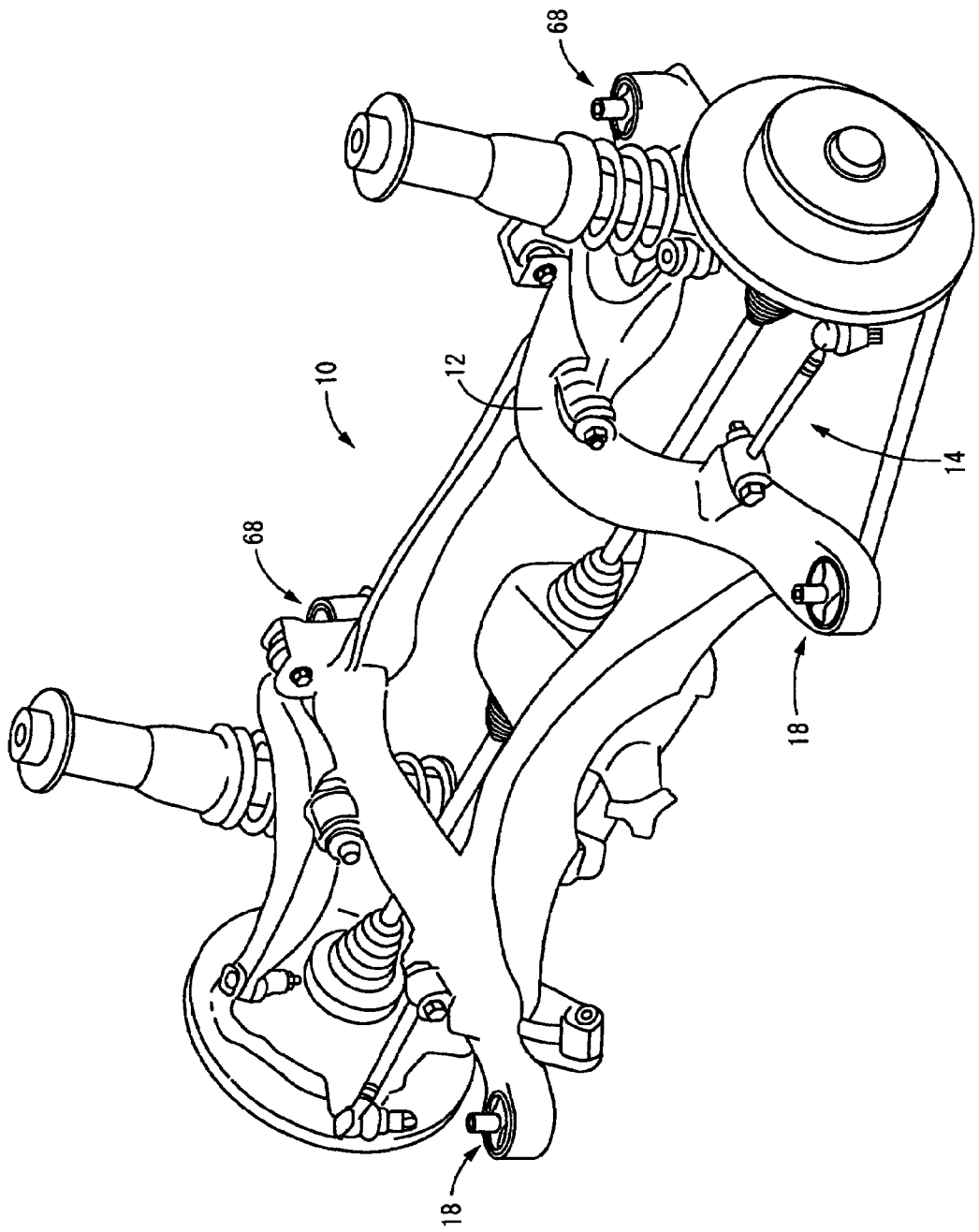
FIG. 1 is a perspective view of a subframe structure of construction according to one preferred embodiment of the invention.

FIG. 1 illustrates a subframe structure 10 of construction according to a first embodiment of the present invention. The subframe structure 10 comprises a subframe 12, through which a rod, a ring, an arm, and other suspension components 14 are held connected to a vehicle body of an automotive vehicle.

The subframe 12 is formed of a steel member having a high stiffness, and is a member that has, overall, an essentially rectangular frame member shape. The suspension components 14, which support each of the wheels 16, are attached to this subframe 12. The subframe 12 is also attached to the vehicle body through a plurality of rubber mounts, e.g., four subframe mounts 18, 18, 68, and 68 in the present form of embodiment.

Figure 2:
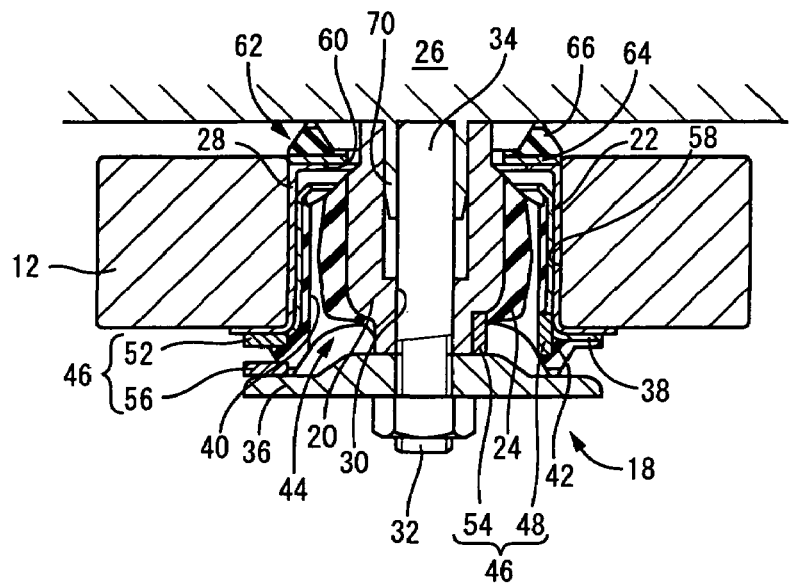
FIG. 2 is a vertical cross sectional view showing the arrangement of a subframe mount usable in the subframe structure of FIG. 1.
Figure 3:
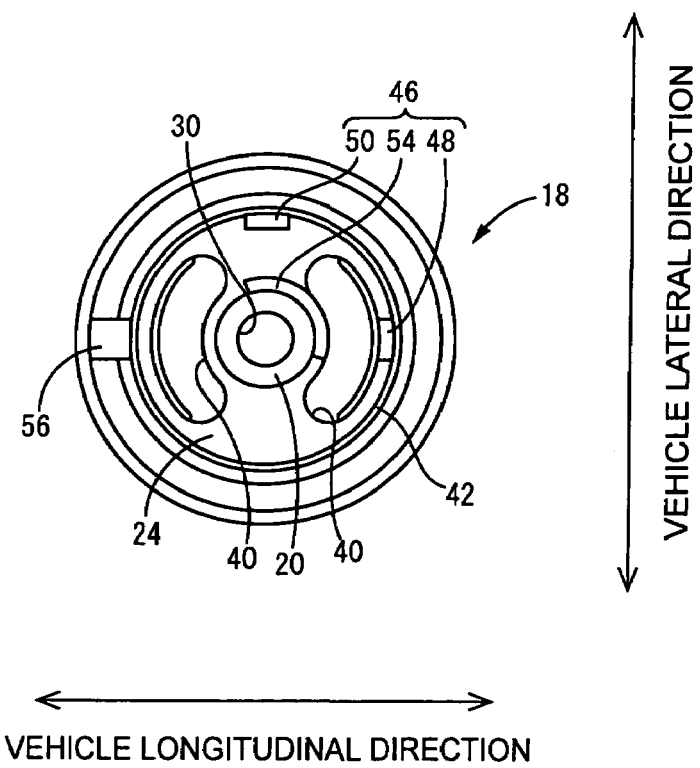
FIG. 3 is a bottom elevational view of the subframe mount of FIG. 2, showing an arrangement of a detecting assembly equipped therein.

As shown in FIGS. 2 and 3, this subframe mount 18 has a structure wherein a metallic inner sleeve 20 functioning as an inner rod member, and a metallic outer sleeve 22 functioning as an outer cylinder member, are connected elastically by a rubber elastic body 24, where the inner sleeve 20 is rigidly affixed to a vehicle body 26, and the outer sleeve 22 is attached to the subframe 12 by a bracket 28.

More specifically, the inner sleeve 20 is formed of a rigid material that has a small-diameter cylindrical shape, and is rigidly affixed to the inner sleeve 20 to either the vehicle body 26 or the subframe 12, by means of an attachment bolt 32 that passes through an inner hole 30 of the inner sleeve 20. The attachment bolt 32 forms a rod 34 in the portion that is nearer the tip part from the approximate center thereof, wherein screw ridges are not formed. Moreover, a stopper contact member 36 is attached at a base end part of the inner sleeve 20. This stopper contact member 36 is an essentially disk-shaped member made from metal, where a bolt through hole, through which the attachment bolt 32 passes, is formed in the radial center thereof.

The outer sleeve 22 is formed of a rigid material, and has a roughly cylindrical shape with thin walls having a radius larger than that of the inner sleeve 20. The base end thereof is bent outwards in its radial direction to form an outer flange 38 around an entire periphery thereof. It should be appreciated that in the present form of embodiment the outer diameter dimension of the outer flange 38 is essentially the same as the outer diameter dimension of the stopper contact member 36.

Furthermore, the outer sleeve 22 is disposed essentially coaxially in the outer radial direction of the inner sleeve 20, where the gap between the facing surfaces of the inner and outer sleeve 20 and 22 is filled with the rubber elastic body 24, elastically linking the inner sleeve 20 and the outer sleeve 22.

This rubber elastic body 24 has an essentially cylindrical shape overall with thick walls, where a pair of lightening holes 40, 40 are formed at respective portions opposed in one diametric direction, corresponding to the front-back or longitudinal direction of the vehicle, so as to extend in the axial direction of the rubber elastic body 24 over a specific circumferential distance. Moreover, the rubber elastic body 24 is integrally formed with a bottom stopper rubber 42 that extends from a bottom side, outer circumferential portion of the rubber elastic body 24, so as to spread over an entire circumference of the outer flange 38, whereby the bottom stopper rubber 42 is axially opposed to the stopper contact member 36 with a given axial gap therebetween. This bottom stopper rubber 42 and the stopper contact member 36 is brought into abutting contact with each other in order to limit excess relative displacement between the inner sleeve 20 and the outer sleeve 22.

The rubber elastic body 24 is bonded by vulcanization at its inner circumferential surface to an outer circumferential surface of the inner sleeve 20, and at its outer circumferential surface to an inner circumferential surface of the outer sleeve 22, thereby forming an integrally vulcanization molded article 44 equipped with inner and outer sleeve 20 and 22.

The integrally vulcanization molded article 44 is equipped with a dislocation sensor 46 as a detecting assembly for measuring the dislocation of the subframe 12, relative to the integrally vulcanization molded article 44, thereby providing the subframe mount 18 having the detecting assembly. In particular, as shown in FIG. 3, Hall elements 48, 50, and 52, and permanent magnets 54 and 56, are used as the dislocation sensor 46 in the present embodiment.

The Hall elements 48, 50, and 52 are elements that are used when detecting the strength of the magnetic field based on the Hall effect, where changes in the magnetic field formed in the vicinity are detected through the output of an electric variable according to the magnitude of the magnetic field. A thin piece of a semiconductor material such as germanium, indium antimony and indium arsenide, is suitable for use.

With these Hall elements 48, 50, and 52, the Hall elements 48 and 50 are attached in the appropriate directions in the longitudinal direction of the vehicle and the lateral direction of the vehicle, respectively, on the inner circumferential surface of the outer sleeve 22, and the Hall element 52 is attached on the bottom surface of the outer flange 38 in a single location in the radial direction.

Moreover, on the outer circumferential surface of the inner sleeve 20, the permanent magnet 54 is attached to a position that faces, in the radial direction, the attachment position of the Hall elements 48 and 50. Moreover, on the top surface of the stopper contact member 36, the permanent magnet 56 is attached to a position that faces, in the axial direction, the attachment position of the Hall element 52.

In the present form of embodiment, the permanent magnet 54 extends around approximately one quarter of the outer circumferential surface of the inner sleeve 20, and is rigidly affixed on the outer circumferential surface at the bottom end of the inner sleeve 20. Moreover, the permanent magnet 56 is attached on the outer circumferential part at the top surface of the stopper contact member 36, and has an essentially flat shape.

It should be appreciated that in the present form of embodiment, the Hall elements 48, 50, and 52 and the permanent magnets 54 and 56 are disposed so that the directions in which the Hall elements 48, 50, and 52 face the permanent magnets 54 and 56 are the longitudinal direction and lateral direction of the vehicle and the vertical direction, respectively, when the subframe mount 18 is attached to the vehicle body 26 and the subframe 12.

Meanwhile, in the vicinity of the four corners of the subframe 12 having an essentially rectangular frame unit shape, there are formed the respective mount attachment holes 58 to which the subframe mounts 18, 18, 68, and 68 are attached. The brackets 28, which have an overall essentially inverted cup shape, are rigidly attached to these mount attachment holes 58, respectively. Each bracket 28 includes an inner insertion hole 60 formed through the center of its top face of, and an bottom edge bent out in the outward radial direction, along the subframe 12, to form flange shapes.

To the top surface of the top face part of the bracket 28 is attached a top stopper member 62 that has an essentially ring shape. The top stopper member 62 comprises a support member 64, which is made from metal and has an essentially flat ring shape, and a top stopper rubber 66, which is fabricated rigidly adhered to the top surface of the support member 64.

The subframe mounts 18 that are equipped with dislocation sensors 46 are pressed into the two brackets 28 and 28 that are equipped towards the front of the vehicle, and the subframe mounts 68, which are not equipped with dislocation sensors 46, are pressed into the two brackets 28 and 28 towards the back of the vehicle. With this arrangement, as shown in FIG. 2, the outer sleeves 22 are firmly secured to the subframe 12 through the brackets 28, while the inner sleeves 20 are inserted in the inner insertion holes 60 formed in the brackets 28, whereby the rods 34 of the attachment bolts 32 that are inserted into the inner holes 30 are pressed into the bolt attachment parts 70 that are equipped protruding to the vehicle body 26, and by welding, or the like, as needed, so that the inner sleeves 20 are rigidly attached to the vehicle body 26. Thus, the subframe 12 and the vehicle body 26 are linked elastically via the subframe mounts 18, 18, 68, and 68.

The inner sleeve 20 with the Hall elements 48, 50, and 52 attached thereto as well as the stopper contact members 36 are rigidly attached to the vehicle body 26, and the outer sleeve 22 with the permanent magnets 54, 56 attached thereto are attached to the subframe 12. Accordingly, the Hall elements 48, 50, and 52, and the permanent magnets 54 and 56 are disposed so as to face each other in each of the longitudinal, lateral, and vertical directions of the vehicle. As a result, the amount of relative dislocation between the subframe 12 and the vehicle body 26 in the longitudinal, lateral, and vertical directions are measured and outputted by the Hall elements 48, 50, and 52, and the permanent magnets 54 and 56.

Namely, the Hall elements 48, 50, and 52, disposed facing the respective permanent magnets 54 and 56, are able to detect the magnetic flux density of the magnetic field that is formed by the permanent magnets 54 and 56. Accordingly, upon variation of the relative distance between the inner sleeve 20 and the outer sleeve 22 of the subframe mount 18, or between the outer flange 38 and the stopper contact member 36, there will be a change in the magnetic flux density detected by the respective Hall elements 48, 50, and 52 because the relative dislocation between the subframe 12 and the vehicle body 26 is inputted into the subframe mounts 18, so that there will be a change in the electric variables that are outputted from the respective Hall element 48, 50, and 52. The amount of relative dislocation between the subframe 12 and the vehicle body 26 can be calculated from the changes in these detection results.

The amount of relative dislocation detected in this way between the subframe 12 and the vehicle body 26 is tightly related to external forces that are inputted into the wheels 16 from the road surface, etc. In other words, the external forces inputted into the wheels 16, in total, act on the subframe 12 through a plurality of suspension arms, and the like, included in the suspension components 14. Moreover, the effect of the application of this sum total of force causes relative dislocations between the subframe 12 and the vehicle body 26 based on deformation of the subframe mounts 18, 18, 68 and 68, which are interposed between the subframe 12 and the vehicle body 26. Accordingly, the amount of relative dislocation between the subframe 12 and the vehicle body 26, which occurs due to the effects of these external forces, is highly correlated with the external forces that act on the wheels 16. Consequently, through the results of measuring the dislocation of the subframe 12 relative to the vehicle body 26 it is possible to infer the external forces acting on the wheels 16. In (Step 1) and (Step 2), below, an example of a method for calculating the external forces that act on the wheels 16 based on a calculation process from the detected values of the amounts of relative dislocations between the subframe 12 and the vehicle body 26 in the present form of embodiment will be explained.

Figure 4:
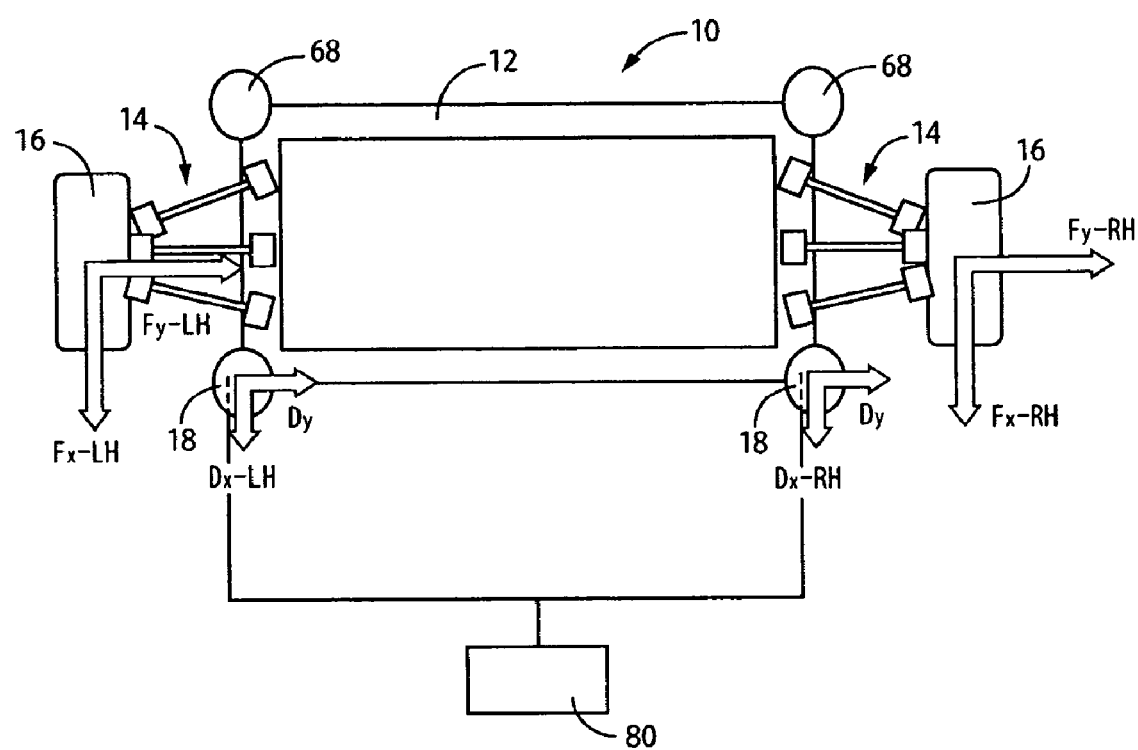
FIG. 4 is a schematic view suitable for explaining an amount of displacement detected in the subframe mount, when the subframe structure of FIG. 1 is subjected to input of loads to wheels in the longitudinal and lateral directions.

(Step 1) First, when the vehicle is in motion, the amounts of relative dislocation in the vehicle longitudinal direction (the x direction as shown in FIG. 4), the vehicle lateral direction (the y direction as shown in FIG. 4) and the vehicle vertical direction (the z direction, which is not shown in FIG. 4, but is a direction orthogonal to the drawing page), are detected as Dx-LH, Dx-RH, Dy, Dz-LH, and Dz-RH, from the dislocation sensors 46 and 46 of the subframe mounts 18 and 18 attached near the left and right edges of the subframe 12. (Step 2) Next, a tire external force calculating unit 80 calculates the external forces in each of the directions x, y, and z that act on the wheel 16, as Fx-LH, Fx-RH, Fy, Fz-LH, and Fz-RH, from the amounts of relative dislocations Dx-LH, Dx-RH, Dy, Dz-LH, and Dz-RH between the subframe 12 and the vehicle body 26, calculated in the above mentioned Step 1. A common calculating unit, such as a microprocessor, is used as the tire external force calculating unit.

The process in (Step 2) can use a calculation equation that takes into account the transmission coefficient, which is the relationship between the transmitted forces and the applied forces, obtained from experimental data measured in advance, to perform the process in (Step 2) by substituting the measured data (the detected values for the various amounts of dislocation) into the equation. More specifically, an equation such as described below may be used. In the equation the values for the coefficients and constants may be rewritten as necessary, thereby enabling more accurate handling even when, for example, the transmission factors change over time or change depending on conditions.

$$\text{External Force Acted on Wheel} = \text{Coefficients} \cdot \text{Subframe Response} + \text{Constants} \quad \text{(Equation 1)}$$

$$\begin{Bmatrix} Fx-LH \\ Fx-RH \\ Fy \\ Fz-LH \\ Fz-RH \end{Bmatrix} =$$

$$\begin{pmatrix} K11 & K12 & K13 & K14 & K15 \\ K21 & K22 & K23 & K24 & K25 \\ K31 & K32 & K33 & K34 & K35 \\ K41 & K42 & K43 & K44 & K45 \\ K51 & K52 & K53 & K54 & K55 \end{pmatrix} \begin{Bmatrix} Dx-LH \\ Dx-RH \\ Dy \\ Dz-LH \\ Dz-RH \end{Bmatrix} + \begin{Bmatrix} C1 \\ C2 \\ C3 \\ C4 \\ C5 \end{Bmatrix}$$

Moreover, the inferred values Fx-LH, Fx-RH, Fy, Fz-LH, and Fz-RH for the external forces that act on the wheels 16, obtained in this manner, can be used as control signals for a vehicle control system, such as an antilock braking system, a traction control system, or a vehicle stability control system, or the like.

In the subframe structure 10 of construction according to the present form of embodiment, the focus is on the subframe 12 that elastically links and supports the suspension components 14 and the vehicle body 26, where the dislocation sensors 46 are disposed in the subframe mounts 18. Since the external forces that act on the wheels 16 act as loads on the subframe 12 through the suspension components 14, by detecting the amount of relative dislocation between the subframe 12 and the vehicle body 26, it is possible to obtain, with excellent accuracy, detection results that have a high direct correlation with the external forces that act on the wheels 16.

Moreover, since the dimensions of the subframe 12 are sufficiently large, the amounts of the relative dislocations between the vehicle body 26 and both edge parts, in the lateral direction of the vehicle, in the subframe 12 are large. Consequently, by detecting the amount of relative dislocation between the subframe 12 and the vehicle body 26 in the subframe mounts 18, attached near both edge parts, in the lateral direction, of the subframe 12, it is possible to detect adequate amounts of relative dislocation even when small external forces are applied. This makes it possible to obtain relative dislocation detection results with increased accuracy and reliability.

In the subframe 12, the attachment positions and alignment are unlikely to change even given the effects of impact loads, making it possible to maintain the initial attachment state with stability. Accordingly, in the detection results of the amount of relative dislocation between the subframe 12 and the vehicle body 26 there are unlikely to be disruptions over time, making it possible to estimate with certainty the external forces that act on the wheels 16.

Moreover, the subframe mount 18 is attached in a position that is suitable distant from the wheels 16 and the road surface, making it possible to prevent damage to the dislocation sensors 46, equipped in the subframe mounts 18, due to gravel, mud, and the like, thrown from the road surface, and possible to prevent negative influences on the detection results, thereby obtaining excellent detection results with superior durability. Furthermore, by attaching the subframe mounts 18 in an appropriate position that is not too far from the wheels 16 or from the road surface, it is possible to reduce time delays and errors in the detection, enabling highly precise detection results without a time lag.

Furthermore, the subframe mounts 18, equipped with the dislocation sensors 46 are installed one each on the left and right at both edge parts, in the lateral direction of the vehicle, towards the front of the subframe 12. With this arrangement, even when there is a load in the twisting or flexing direction relative to the subframe 12, the twisting or flexing load will not act on each of the individual subframe mounts 18 and 18 equipped on the left and right edges, making it possible to avoid any negative impact in the detection results of the application of this type of load.

Moreover, disposing the dislocation sensors 46 in the subframe mounts 18 enables the attachment of the dislocation sensors 46 to the vehicle easily with about the same amount of work as the conventional process of attaching the subframe 12 to the vehicle, without requiring any special attachment operations for attaching the subframe 12 to the vehicle body 26, and enables the estimation of the external forces that act on the wheels 16.

In the subframe mounts 18, the dislocation sensors 46 are disposed such that the permanent magnets 54 and 56 and the Hall elements 48, 50, and 52 are each disposed facing each other on the vehicle body 26 side and the subframe 12 side, structured so as to perform the detection based on the amount of electricity produced based on the Hall effect due to changes in the relative distances between the permanent magnets 54 and 56 and the Hall elements 48, 50, and 52. With this arrangement, it is not only possible to output, easily and efficiently, the changes in the relative distances between the subframe 12 and the vehicle body 26, but also possible to avoid any reductions in detection performance due to soiling, etc., even when used in a vehicle that is used outdoors.

By calculating the external forces that are applied to the wheels 16 in the longitudinal, lateral, and vertical directions of the vehicle, it is possible to use the detection results as control signals in a variety of vehicle control systems, such as antilock braking systems, traction control systems, and vehicle stability control systems.

In addition, as will be apparent from the equation illustrated above, it is possible to infer independently, for each individual wheel, the external forces that are applied to the wheels 16. As a result, the application of the data detected by the subframe structure 10 as a control signal in a variety of vehicle control systems, such as antilock braking systems, traction control systems, and vehicle stability control systems, enables independent control of the individual wheels with reduced time lags, ensuring the achievement of reduced braking distances and improved hazard avoidance performance. It should be appreciated that when it comes to the lateral forces that are inputted in the vehicle lateral direction, only the total value for the left and right wheels is calculated; while the detection results for the lateral forces are primarily used to control lateral slippage of the vehicle and spinning.

Thus, the difference in lateral forces applied to the front and back wheels is important from the perspective of vehicle control, and it is not necessarily essential to obtain data for the left and right wheels separately. Accordingly, it is possible to achieve effective control of the vehicle even with the detection results according to the present form of embodiment.

While one preferred embodiment of the present invention has been described above in detail, this example is merely illustrative, and the present invention should not be interpreted to be limited in any way by the specific description in the example form of embodiments.

For example, while, in the form of embodiment described above, the dislocation sensors 46 were equipped in the subframe mounts 18, the dislocation sensors 46 may be disposed wherever it is possible to detect changes in the relative distance between the subframe 12 and the vehicle body 26, where the location of installation is in nowise limited by the form of embodiment described above. Specifically, it is possible to detect directly changes in the relative distance between the subframe 12 and the vehicle body 26 by securely mounting the permanent magnets 54 and 56 on the top surface of the subframe 12, for example, and securely mounting the Hall elements 48, 50, and 52 on the bottom surface of the vehicle body 26.

Moreover, while the external forces acting on the wheels 16 were estimated through detecting changes in the relative distance between the subframe 12 and the vehicle body 26 through dislocation sensors 46 in the form of embodiment described above, it is not necessary to use dislocation sensors 46 to detect the dislocation, as a detecting assembly, and the detected value need not necessarily be an amount of dislocation. For example, any mechanism or element may be used insofar as it is possible to obtain an output signal corresponding to the load that acts between the subframe 12 and the vehicle body 26 as a result of external forces that act on the wheels 16. More specifically, a load sensor, or the like, may be used to detect changes in the load. For example, the relative acceleration between the subframe 12 and the vehicle body 26 may be detected using acceleration sensors, or the like.

Furthermore, while in the form of embodiment described above, the example was given wherein, of the four subframe mounts 18, 18, 68, and 68 disposed at four locations of the subframe 12, only the two subframe mounts 18, equipped with the dislocation sensors 46, were used. Instead, any number of subframe mounts 18 equipped with this type of dislocation sensor 46 may be used. Specifically, the amount of relative dislocations of the subframe mounts 18 relative to the vehicle body 26 may be detected at three or more points, making it possible to further improve the detection accuracy.

Moreover, while in the illustrated embodiment, the dislocation sensors 46, that detect the amounts of relative dislocations between the subframe 12 and the vehicle body 26 in the three directions (the longitudinal, the lateral, and vertical vehicle directions) were structured using three Hall elements 48, 50, and 52, and two permanent magnets 54 and 56 that face these Hall elements 48, 50, and 52, it is not necessary to detect the amounts of relative dislocation in three directions, but rather, as needed, it is also possible to detect only in two directions, the longitudinal direction and the vertical direction.

The subframe 12 is connected with anti-vibration to the vehicle body 26 through subframe mounts 18, 18, 68 and 68, and thus the amounts of relative dislocation between the subframe 12 and the vehicle body 26 resulting from the application of external forces on the wheels 16 generally occur in magnitudes that are effective for detecting the external forces. With this arrangement, it is possible to detect with high accuracy the amounts of relative dislocation between the subframe 12 and the vehicle body 26 using the dislocation sensors 46.

Figure 5:
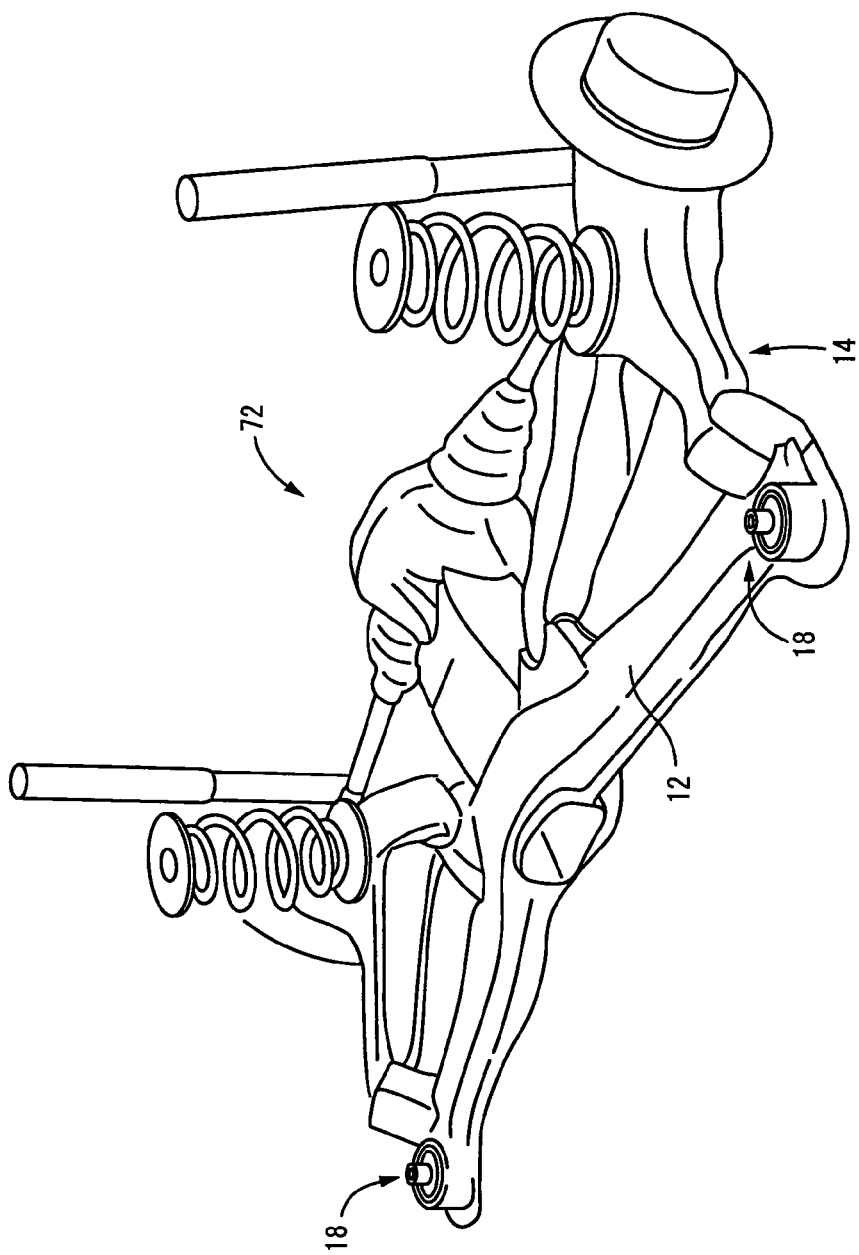
FIG. 5 is a perspective view of a subframe structure of construction according to another preferred embodiment of the invention.
Figure 6:
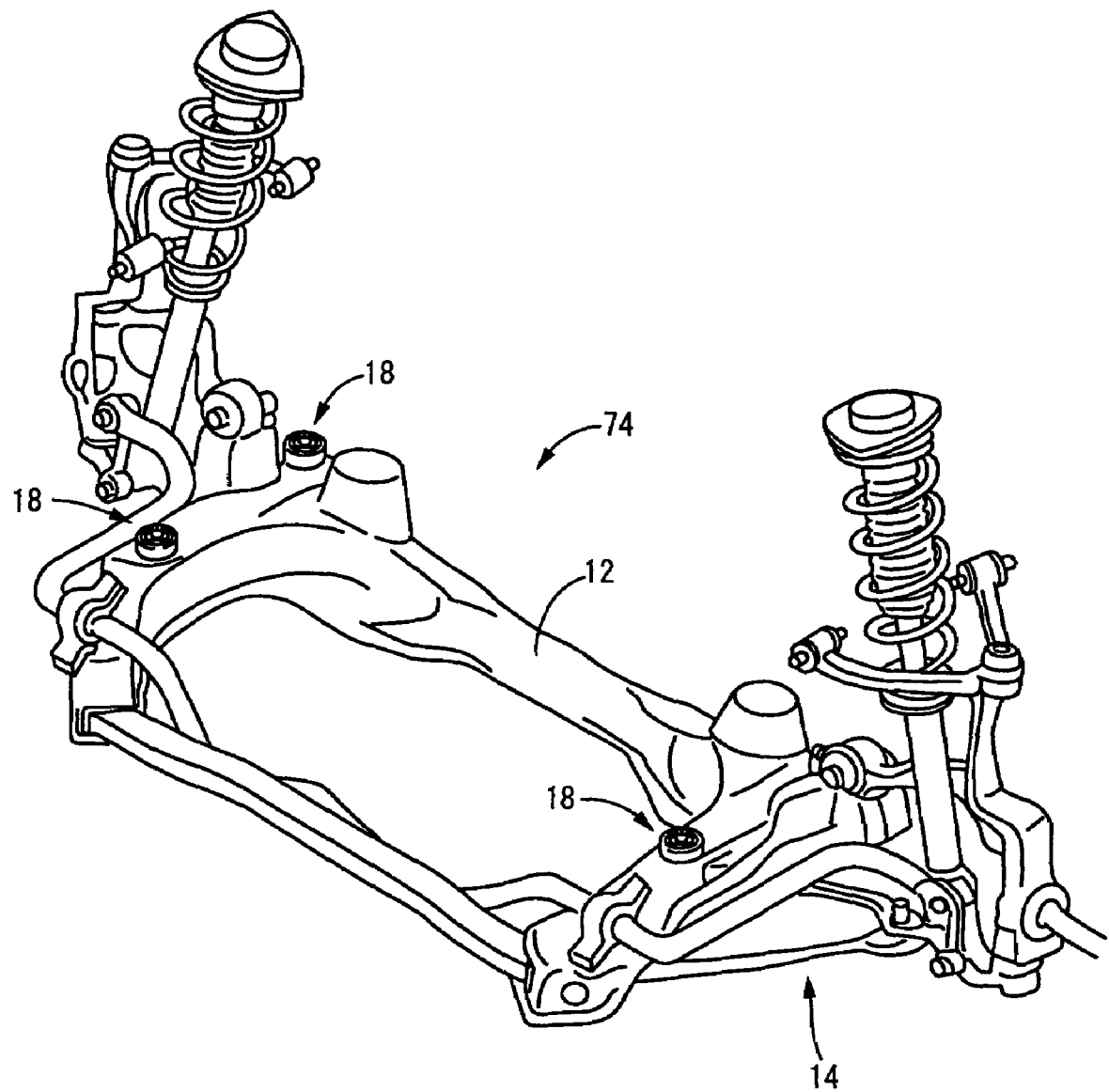
FIG. 6 is a perspective view of a subframe structure of construction according to yet another preferred embodiment of the invention.

While the present invention as been described in detail with respect to the subframe structure 10 used in the rear suspension of an automotive vehicle chassis, as one form of embodiment, the principle of the invention will be applied to a variety of other vehicle chassis as well. Specifically, the present invention can be applied also to a variety of types of suspensions such as, for example, application in a subframe structure 72 used in a semi-trailing-type suspension such as shown in FIG. 5, or, as shown in FIG. 6, can also be applied to a subframe structure 74 that is used in a front suspension. It should be appreciated that for ease in understanding, structure, members, and parts that are essentially the same as in the form of embodiment described above are assigned the same numerals in FIGS. 5 and 6 as in the drawings in the illustrated embodiment.

It is also to be understood that the present invention may be embodied with various other changes, modifications and improvements, which may occur to those skilled in the art, without departing from the spirit and scope of the invention defined in the following claims.

What is claimed is:

1. A subframe structure for an automotive vehicle wherein a subframe is attached through a rubber mount to a vehicle body, suspension components are assembled onto the subframe so that the suspension components are held connected to the vehicle body through the subframe, and a detecting assembly capable of providing an output signal according to a load that acts between the subframe and the vehicle body is provided.

2. A subframe structure according to claim 1, wherein the detecting assembly is provided in at least one location in a vicinity of each end of the subframe in a lateral direction of the vehicle.

3. A subframe structure according to claim 1, further comprising a calculating unit for calculating each of external forces acting on wheels of the vehicle in longitudinal, lateral, and vertical directions of the vehicle, based on output signals obtained from the detecting assembly.

4. A subframe structure according to claim 1, wherein the detecting assembly includes a permanent magnet that is connected in a fixed position relative to one side of the subframe and the vehicle body, and a Hall element that is equipped in a fixed position relative to another side of the subframe and the vehicle body.

5. A subframe structure according to claim 1, wherein the detecting assembly is a relative position detecting assembly for detecting, in a total of three directions, the directions being an axial direction and two directions that are perpendicular to the axial direction, a relative amount of dislocation between the subframe and the vehicle body.

6. A subframe structure according to claim 1, wherein the detecting assembly is equipped on the rubber mount.

7. A subframe structure according to claim 6, wherein the rubber mount comprises an inner rod member that is rigidly affixed to the vehicle body, an outer cylinder member that is rigidly affixed to the subframe and disposed so as to enclose the inner rod member with a gap around an outer peripheral side of the inner rod member, a rubber elastic body that elastically connects this inner rod member and outer cylinder member, and a relative position detecting assembly for detecting a relative amount of dislocation of the inner rod member and the outer cylinder member.

* * * * *